United States Patent
Lee

(10) Patent No.: US 12,038,621 B2
(45) Date of Patent: Jul. 16, 2024

(54) LENS MODULE AND CAMERA MODULE

(71) Applicant: LG INNOTEK CO., LTD., Seoul (KR)

(72) Inventor: Min Woo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 969 days.

(21) Appl. No.: 16/980,780

(22) PCT Filed: Mar. 19, 2019

(86) PCT No.: PCT/KR2019/003178
§ 371 (c)(1),
(2) Date: Sep. 14, 2020

(87) PCT Pub. No.: WO2019/182324
PCT Pub. Date: Sep. 26, 2019

(65) Prior Publication Data
US 2021/0103120 A1     Apr. 8, 2021

(30) Foreign Application Priority Data

Mar. 20, 2018   (KR) .................. 10-2018-0032020

(51) Int. Cl.
*G02B 7/02*      (2021.01)
(52) U.S. Cl.
CPC ............. *G02B 7/028* (2013.01); *G02B 7/026* (2013.01)
(58) Field of Classification Search
CPC ........ G02B 7/028; G02B 7/026; G02B 13/16; G02B 27/0006; G02B 7/021; G02B 7/1815; G03B 17/02; G03B 17/55; G03B 30/00; H04N 23/00
See application file for complete search history.

(56) References Cited

U.S. PATENT DOCUMENTS

2017/0299947 A1   10/2017   Nakamura et al.
2019/0137850 A1*   5/2019   Ha .................... G02B 7/028

FOREIGN PATENT DOCUMENTS

| CN | 107728408 A |   | 2/2018 |  |
|---|---|---|---|---|
| CN | 111868623 A | * | 10/2020 |  |
| EP | 3 032 327 A1 |   | 6/2016 |  |
| JP | 2013142838 A | * | 7/2013 |  |
| JP | 2017-200087 A |   | 11/2017 |  |
| JP | 6504487 B1 | * | 4/2019 | ............ G03B 17/08 |
| KR | 10-2010-0102827 A |   | 9/2010 |  |

(Continued)

OTHER PUBLICATIONS

International Search Report dated Jun. 21, 2019 in International Application No. PCT/KR2019/003178.

(Continued)

*Primary Examiner* — Pinping Sun
*Assistant Examiner* — Muhammad Alawi Fadag
(74) *Attorney, Agent, or Firm* — Saliwanchik, Lloyd & Eisenschenk

(57) ABSTRACT

A lens module and a camera module are provided. According to one aspect of the present invention, the lens module comprises: a lens; a heating member arranged on the lens; a power supply member for supplying current to the heating member; and a lens barrel including a first hole through which the power supply member penetrates and accommodating the lens.

5 Claims, 12 Drawing Sheets

(56) References Cited

FOREIGN PATENT DOCUMENTS

| KR | 20170021088 A | * | 8/2015 | | |
|---|---|---|---|---|---|
| KR | 10-2016-0142627 A | | 12/2016 | | |
| KR | 10-2017-0021088 A | | 2/2017 | | |
| KR | 10-2017-0095613 A | | 8/2017 | | |
| KR | 102277896 B1 | * | 7/2021 | | |
| WO | WO-2016/164173 A1 | | 10/2016 | | |
| WO | WO-2017142203 A1 | * | 8/2017 | ......... | G02B 27/0006 |

OTHER PUBLICATIONS

Office Action dated Aug. 9, 2021 in Chinese Application No. 201980019990.4.

* cited by examiner

LENS MODULE AND CAMERA MODULE

CROSS-REFERENCE TO RELATED APPLICATIONS

This application is the U.S. national stage application of International Patent Application No. PCT/KR1029/003178, filed Mar. 19, 2019, which claims the benefit under 35 U.S.C. § 119 of Korean Patent Application No. 10-2018-0032020, filed Mar. 20, 2018, the disclosures of each of which are incorporated herein by reference in their entirety.

TECHNICAL FIELD

The present invention relates to a lens module and a camera module.

BACKGROUND ART

Recently, miniature camera modules have been developed, and the miniature camera modules have been widely used in small electronic products such as smartphones, laptops, game machines, and the like.

As automobiles are widely supplied to the public, miniature cameras are widely used in vehicles as well as electronic products. For example, they are provided with a black box camera for the protection of a vehicle or for objective data of traffic accident, a rear surveillance camera that allow a driver to monitor the blind spot on the rear of the vehicle to ensure safety when the vehicle is backing up, a peripheral area detection camera for monitoring the vehicle's surroundings, and the like.

A camera may be provided with a lens, a lens holder accommodating the lens, an image sensor for converting an image of a subject collected in the lens into an electrical signal, and a printed circuit board on which the image sensor is mounted. The housing forming the outer shape of the camera has a structure in which the entire area is sealed to inhibit the internal components from being contaminated from foreign substances including moisture.

Due to the characteristics of automobiles being disposed outdoors, indoor and outdoor temperatures of the automobiles form various distributions depending on the time. For example, the indoor temperature may be formed higher than the outdoor temperature in summer, and may drop to below zero in winter. Therefore, condensation, including frost, may occur in the components including the lens and the glass of the camera according to an abrupt temperature change. As a result, satisfactory photographing may not be obtained, or product failure may be caused.

DETAILED DESCRIPTION OF THE INVENTION

Technical Subject

The problem to be solved by the present invention is to provide a lens module and a camera module that can inhibit the occurrence of condensation, including frost, in a lens.

Technical Solution

A lens module according to an aspect of the present invention for achieving the above objective comprises: a lens; a heating member arranged on the lens; a power supply member electrically connected to the heating member; and a lens barrel including a first hole through which the power supply member penetrates and accommodating the lens.

In addition, the heating member may comprise an indium tin oxide (ITO) film.

In addition, it may further comprise an elastic member arranged between one end of the power supply member connected to the heating member and an inner side surface of the lens barrel facing the one end of the power supply member.

In addition, the elastic member may be in the shape of a ring.

In addition, at least a portion of the power supply member may be bent.

In addition, the lens barrel may comprise: a first accommodating portion which accommodates at least a portion of the lens and the power supply member; an extension portion formed by being extended from the first accommodating portion toward the inner side of the lens barrel; and a vertical portion formed by being extended from the extension portion toward the lower side of the lens barrel.

In addition, at least a portion of the power supply member may be arranged at a position being overlapped with the extension portion and the heating member on a direction parallel to the optical axis.

A camera module according to an aspect of the present invention for achieving the above object may comprise: a lens; a lens barrel comprising a first hole and accommodating the lens; a lens holder accommodating the lens barrel; a printed circuit board arranged in the lens holder; a heating member arranged in the lens; and a power supply member penetrating the first hole and electrically connecting the heating member and the printed circuit board.

In addition, the power supply member may comprise: a one end connected to the heating member; a connecting portion formed by being extended from the one end and passing between the lens barrel and the lens holder; and other end formed by being extended from the connecting portion and connected to a printed circuit board.

In addition, at least a portion of the connecting portion may be bent.

In addition, the lens holder may comprise a second accommodating portion accommodating the lens barrel and a sealing portion sealing between the second accommodating portion and the lens barrel.

In addition, the sealing portion may comprise a second hole through which the connecting portion penetrates.

In addition, the lens holder may further comprise a guide member for guiding the power supply member to penetrate the second hole.

In addition, the second hole may be arranged adjacent to an outer side surface of the lens holder with respect to the optical axis of the lens.

Advantageous Effects

Through this exemplary embodiment, it is possible to provide a lens module and a camera module that can inhibit the occurrence of condensation, including frost, in a lens.

BEST MODE

Figure 1:
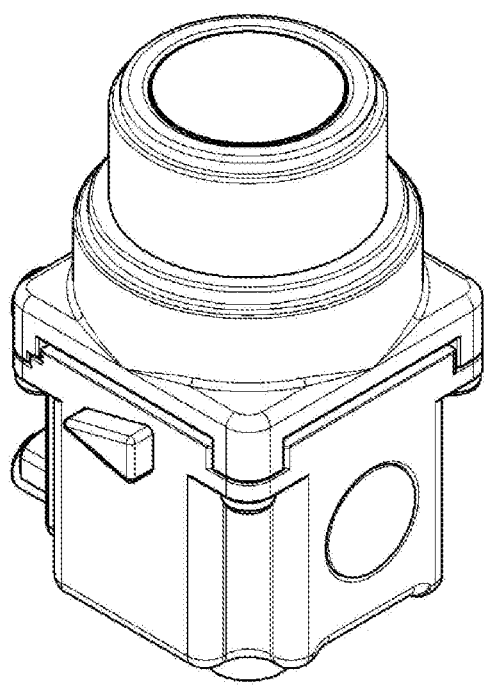
FIG. 1 is a perspective view of a camera module according to an exemplary embodiment of the present invention.

Hereinafter, exemplary embodiments of the present invention will be described in detail with reference to the accompanying drawings. Advantages and features of the present invention, and methods for achieving them will be apparent with reference to the exemplary embodiments described below in detail in conjunction with the accompanying drawings. However, the present invention is not limited to the exemplary embodiments disclosed below, but may be implemented in various different forms, and the present exemplary embodiments are merely provided to complete the disclosure of the present invention and to fully inform the scope of the invention to those skilled in the art to which the present invention belongs, and the present invention will be merely defined by the scope of the claims. Like refer to like elements throughout. Throughout the specification, the same reference numeral refers to the same component.

Unless otherwise defined, all terms (including technical and scientific terms) used in the present specification may be used in a meaning that can be commonly understood by those skilled in the art to which the present invention belongs. In addition, terms that are defined in commonly used dictionaries are not ideally or excessively interpreted unless they are specifically defined clearly.

In addition, the terms used in the exemplary embodiments of the present invention are intended to describe the exemplary embodiments and are not intended to limit the present invention. In this specification, the singular may also include the plural unless specifically stated in the text. As used in this specification, 'comprises' and/or 'comprising' means not to exclude the presence or addition of one or more other components, steps, and/or operations In addition to the components, steps, and/or operations mentioned. And "and/or" includes each and all combinations of one or more of the items mentioned.

In describing the components of the exemplary embodiment of the present invention, terms such as first, second, A, B, (a), and (b) may be used. These terms are merely intended to distinguish the components from other components, and the terms do not limit the nature, order or sequence of the components. When a component is described as being 'connected', 'coupled' or 'jointed' to another component, the component may be directly connected, coupled or jointed to the another component, but it should be also understood that yet another component may be 'connected', 'coupled' or 'jointed' between the component and the another component. 'Optical axis direction' used below is defined as the optical axis direction of the lens coupled to the lens driving device. Meanwhile, the 'optical axis direction' may correspond to the 'up and down' direction and the 'z axis direction.

Hereinafter, the present invention will be described in more detail with reference to the accompanying drawings.

Figure 2:
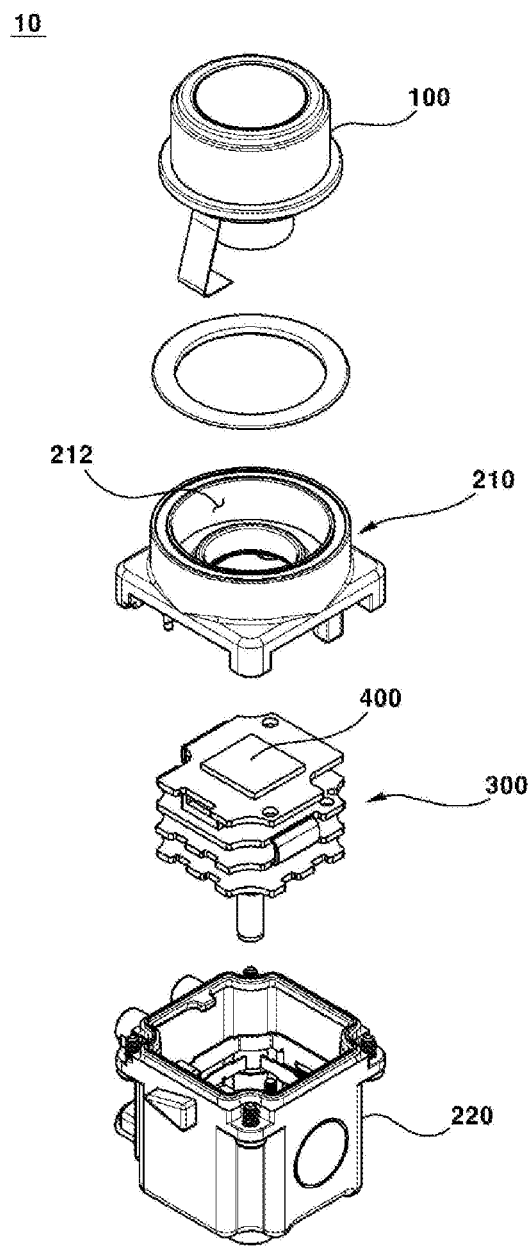
FIG. 2 is an exploded perspective view of a camera module according to the exemplary embodiment of the present invention.
Figure 3:
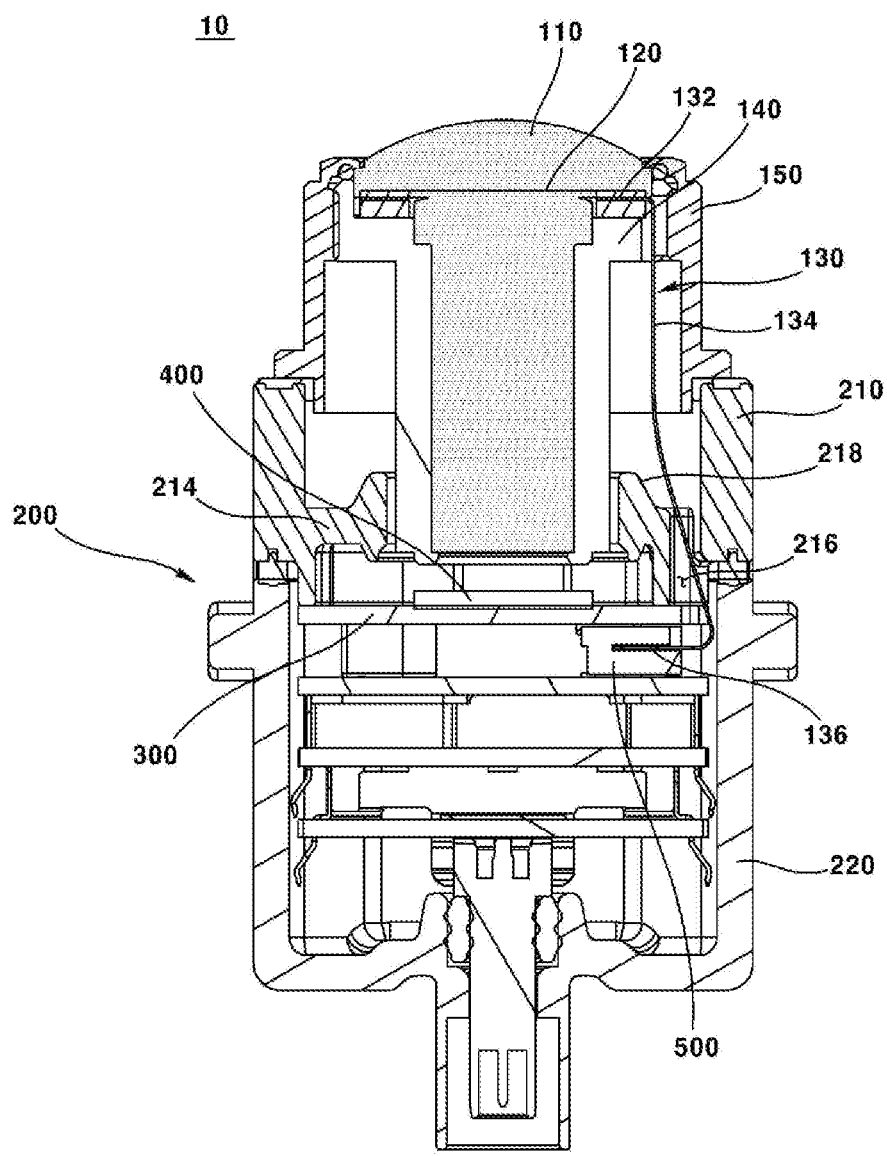
FIG. 3 is a cross-sectional view of a camera module according to the exemplary embodiment of the present invention.

FIG. 1 is a perspective view of a camera module according to an exemplary embodiment of the present invention; FIG. 2 is an exploded perspective view of a camera module according to the exemplary embodiment of the present invention; FIG. 3 is a cross-sectional view of a camera module according to the exemplary embodiment of the present invention; and FIG. 4 is a cross-sectional view of a lens module according to another exemplary embodiment of the present invention.

Referring to FIGS. 1 to 4, a camera module 10 according to an exemplary embodiment of the present invention may comprise: a lens module 100; a lens holder 200; a printed circuit board 300; an image sensor 400; a first power supply member 500; and a coupling member 600, however, it may be implemented excluding a part of these components, and other additional components are not excluded.

Referring to FIG. 3, a lens module 100 according to an exemplary embodiment of the present invention may comprise: a lens 110; a heating member 120; a second power supply member 130; a lens barrel 140; a retainer 150; and a waterproof member 170. Although the lens module 100 according to the exemplary embodiment of the present invention is illustrated as comprising one lens 110, the number of lenses 110 included in the lens module 100 is not limited thereto and may be variously changed. The first power supply member 500 and the second power supply member 130 may each be referred to herein as "power supply member", but they are identified by their respective reference numerals.

Figure 4:
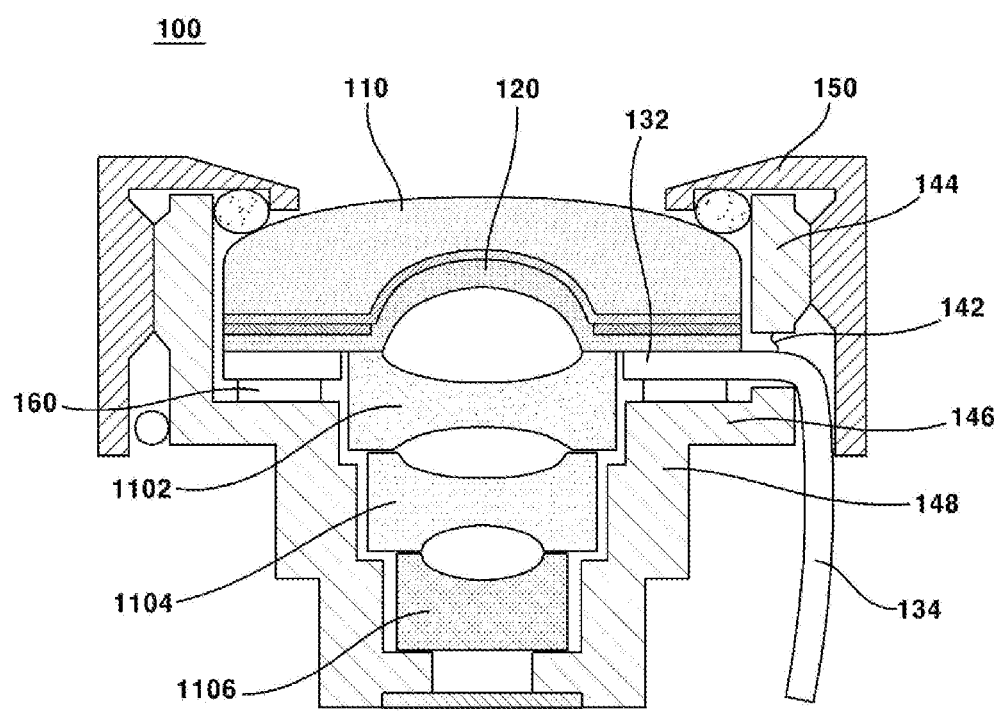
FIG. 4 is a cross-sectional view of a lens module according to another exemplary embodiment of the present invention.

Referring to FIG. 4, the lens module 100 according to another exemplary embodiment of the present invention may comprise four lenses 110, 1102, 1104, and 1106. At this time, the second lens 1102 is arranged in the lower side of the first lens 110, the third lens 1104 is arranged in the lower side of the second lens 1102, and the fourth lens 1106 is arranged in the lower side of the third lens 1104, so that they can be stacked on each other. Although in other exemplary embodiments of the present invention the first to fourth lenses 110, 1102, 1104, 1106 are illustrated and described as being coupled to the lens barrel 140, however, as described above, more than four or less than four lenses may be arranged in the lens barrel 140. The lens module 100 may comprise an elastic member 160.

In the exemplary embodiment of the present invention, the lenses 110, 1102, 1104, and 1106 may be made of synthetic resin, glass material, or quartz material, but are not limited thereto and can be made from a variety of materials.

The heating member 120 is arranged in the lens 110. The heating member 120 is configured to generate heat by receiving power, and may be a transparent heating film coated with indium thin oxide (ITO) having conductivity capable of generating heat due to its resistivity. The heating member 120 may be formed by, for example, a coating process or a vapor deposition process of an indium tin oxide material. However, this is merely an example, and the material of the heating member 120 may be variously changed without being limited thereto as long as the material may be electrically connected to generate heat. Meanwhile, the heating member 120 may be coated to cover the entire lower surface of the lens 110. Alternatively, the heating member 120 may be coated on a partial region of the lens 110. For example, the heating member 120 may be coated in the shape of a ring along the edge region of the lens 110.

The heating member 120 receives current from the power supply member 130, which will be described later, to generate heat. As a result, heat is conducted to the lens 110, and the lens 110 reaches a target temperature so that frost, condensation and freezing may be inhibited or avoided. Although the heating member 120 is illustrated as being arranged on the lower surface of the lens 110 in FIG. 4, the position at which the heating member 120 is arranged may be variously changed without being limited thereto.

The power supply member 130 is electrically connected to the heating member 120 and the printed circuit board 300 to provide a current to the heating member 120. Specifically, the power supply member 130 may comprise: a One end 132 connected to the heating member 120; a connecting portion 134 formed by being extended from the one end 132 and passing between a lens barrel 140 and a lens holder 200 which will be described later; and other end 136 formed by being extended from the connecting portion 134 and connected to the power supply member 500 being installed in a PCB 300 which will be described later. At this time, the one end 132, the connecting portion 134, and the other end 136 may be formed integrally, but may be separately manufactured and connected respectively.

In addition, at least a portion of a power supply member 130 may be bent. Specifically, as illustrated in FIG. 3, the connecting portion 134 of the power supply member 130 may be bent once at a portion connected to one end 132 and bent once at a portion connected to the other end 136. At this time, the power supply member 130 may be formed of a flexible material, and receives power from the power supply member 500 to supply current to the heating member 120. As a result, the heating member 120 may generate heat.

The lens barrel 140 may accommodate the lens 110. Specifically, it may comprise: a first accommodating portion 144 for accommodating the lens 110; an extension portion 146 formed by being extended from the first accommodating portion 144 toward the inner side of the lens barrel 140; a vertical portion 148 formed by being extended from the extension portion 146 toward the lower side of the lens barrel 140; and a first hole 142 penetrated by the power supply member 130, however, the specific configuration or shape of the lens barrel 140 is not limited thereto and may be variously changed.

At this time, at least a portion of the power supply member 130 may be located in the inner side surface of the lens barrel 140. Specifically, one end 132 of the power supply member 130 may be arranged in a position overlapping with the heating member 120 of the extension portion 146 of the lens barrel 140.

In an exemplary embodiment of the present invention, the lens barrel 140 may be formed by processing a metal material. At this time, the lens barrel 140 formed by processing the metal material may be coated with a non-metal material to inhibit diffuse reflection.

The first accommodating portion 144 of the lens barrel 140 may accommodate the lens 110 which serves to provide external light to the image sensor 400 mounted in the printed circuit board 300. As described above, one lens 110 or a plurality of lenses 110, 1102, 1104, and 1106 may be stored and fixed in the first accommodating portion 144. The first accommodating portion 144 may be formed in the shape of a cylinder to store and fix the lens 110, but the shape of the first accommodating portion 144 may be variously changed without being limited thereto. The retainer 150 may be coupled to the lens barrel 140 to fix the lens 110 accommodated in the lens barrel 140. At this time, the retainer 150 is formed in the shape of an 'inverted L' so as to downwardly press and fix the lens 110 accommodated in the lens barrel, and can be coupled with the lens barrel 140 by using and an adhesive member such as epoxy and the like. However, if the lens 110 accommodated in the lens barrel 140 can be fixed, the shape of the retainer 150 or the coupling method with the lens barrel 140 may be variously changed without being limited thereto.

The elastic member 160 is arranged between the one end 132 of the power supply member 130 connected to the heating member 120 and the inner side surface of the lens barrel 140 facing the one end 132 of the power supply member. Specifically, the elastic member 160 may be arranged below the lower surface of the one end 132 of the power supply member 130 attached to the heating member 120 and above the upper surface of the extension portion 146 of the lens barrel 140.

When the heating member 120 and the power supply member 130 are directly bonded without a separate configuration, a contact failure between the heating member 120 and the power supply member 130 may occur due to an externally applied vibration or shock. An elastic member 160 is arranged between the lower surface of the one end 132 of the power supply member 130 attached to the heating member 120 and the upper surface of the extension portion 146 of the lens barrel 140, and when the retainer 150 presses the lens 110 downward, the elastic member 160 applies a force upward to make the power supply member 130 be in contact with the heating member 120 elastically so that the heating member 120 and the power supply member 130 can always be connected with each other.

In the exemplary embodiment of the present invention, the elastic member 160 is illustrated in a sheet shape, but is not limited thereto and may be variously changed, such as a spring member, such as a plate spring or a coil spring. If the elastic member 160 is a spring member, a groove (not shown) for fixing one end of the spring member may be formed on the inner side surface of the lens barrel 140 to inhibit the position of the spring from being changed. When one end of the spring member is stored in the groove, the other end of the spring member is protruded from the groove, and the other end of the spring member, that is protruded, may make the power supply member 130 be in close contact with the heating member 120 elastically. At this time, the elastic member 160 may be in the shape of a ring. When the cross section of the lens 110, the heating member 120, the power supply member 130, and the inner side surface of the lens barrel 140 is in the shape of a circle or ellipse, the elastic member 160 is formed to be in the shape of a ring to widen the cross-sectional area which is in contact with the inner side surface of the power supply member 130 and the lens barrel 140 so that the power supply member 130 and the heating member 120 can be in close contact with each other more elastically.

The waterproof member 170 is arranged between the lens 110 and the lens barrel 140 to remove a gap formed between the lens 110 and the lens barrel 140, thereby inhibiting foreign substances from entering the lens module 100 so that a firm coupling between the lens 110 and the lens barrel 140 can be provided. At this time, the waterproof member 170 may be formed of an elastically deformable material such as rubber and the like, but the material of the waterproof member 170 may be variously changed without being limited thereto.

The lens holder 200 may comprise an upper lens holder 210 accommodating the lens barrel 140 and a lower lens holder 220 accommodating the printed circuit board 300. At this time, the upper lens holder 210 and the lower lens holder 220 may be integrally formed, but may also be separately manufactured and combined.

The upper lens holder 210 may comprise: a second accommodating portion 212 for accommodating the lens barrel 140; a sealing portion 214 formed by being extended from the second accommodating portion 212 inwardly (inside) of the upper lens holder 210 to remove a gap occurring between the second accommodating portion 212 and the lens barrel 140; a second hole 216 being formed in the sealing portion 214 and penetrated by the power supply member 130; and a guide member 218 for guiding power supply member 130 to penetrate the second hole 216.

The second accommodating portion 212 may provide a space for accommodating the lens barrel 140, and the lens barrel 140 may be accommodated in the second accommodating portion 212 and coupled to the upper lens holder 210. The second accommodating portion 212 may be formed in the shape of a cylinder corresponding to the shape of the lens barrel 140. At this time, a gap may be formed between the inner side surface of the second accommodating portion 212 and the outer side surface of the lens barrel 140.

The sealing portion 214 removes the gap formed between the inner side surface of the second accommodating portion 212 and the outer side surface of the lens barrel 140, so that the entering of foreign substances from the inside of the upper lens holder 210 into the printed circuit board 300 arranged in the lower lens holder 220 can be inhibited. The sealing portion 214 may be formed in the shape of a donut corresponding to the shape of the second accommodating portion 212 and the lens barrel 140.

The second hole 216 may be formed in the sealing portion 214 corresponding to the cross-sectional shape of the connecting portion 134 of the power supply member 130. At this time, the second hole 216 is formed at a position adjacent to the outer side surface of the upper lens holder 210 with respect to the optical axis of the lens 110, thereby making the other end 136 of the power supply member 130 passing through the second hole 216 be in contact with the printed circuit board 300 easily.

The guide member 218 is formed by being extended from the sealing portion 214 so that the power supply member 130 can be guided to penetrate the second hole 216. At this time, it is formed to be inclined so that the upper portion of the guide member 218 is located in the inner side and the lower portion is located in the outer side, and thereby, the power supply member 130 may be guided to the second hole 216 formed at a location adjacent to the outer side surface of the upper lens holder 210. However, the shape of the guide member 218 is not limited thereto, and may be variously changed according to the location of the second hole 216.

The lower lens holder 220 accommodates the printed circuit board 300. At this time, the lower lens holder 220 forms a hollow therein so that light passing through the lens 110 can be received by the image sensor 400 mounted in the printed circuit board 300.

In the exemplary embodiment of the present invention, the lens holder 200 may be made of a non-metallic material such as a synthetic resin material and the like using a plastic injection or die casting method, but is not limited thereto.

The printed circuit board 300 may be arranged in the lens holder 200. At this time, the printed circuit board 300 may be coupled to the lens holder 200 by a coupling screw and the like. The printed circuit board 300 may comprise a flexible printed circuit board (FPCB).

As illustrated in FIG. 3, the printed circuit board 300 may comprise a plurality of printed circuit boards (PCBs). At this time, each printed circuit board may be spaced apart from each other, and arranged in parallel to improve space efficiency. Each printed circuit board may be electrically connected to each other by a connector or a flexible printed circuit board (FPCB). In the exemplary embodiment of the present invention, the plurality of printed circuit boards is illustrated as four, but the number of the plurality of printed circuit boards is not limited thereto and may be variously changed.

The printed circuit board 300 according to the exemplary embodiment of the present invention may be replaced with a substrate or a circuit board.

The image sensor 400 is mounted on the printed circuit board 300. At this time, the image sensor 400 may be electrically connected to the printed circuit board 300. For example, the image sensor 400 may be coupled to the printed circuit board 300 by surface mounting technology (SMT). As another example, the image sensor 400 may be coupled to the printed circuit board 300 by flip chip technology.

The image sensor 400 is arranged on a path of light passing through the lens 110. The image sensor 400 may convert light irradiated to the effective image area of the image sensor 400 into an electrical signal. The image sensor 400 may be any one of a charge coupled device (CCD), a metal oxide semi-conductor (MOS), a CPD, and a CID, but is not limited thereto.

The optical axis of the image sensor 400 may be arranged to coincide with the optical axis of the lens 110. That is, the optical axis of the image sensor 400 and the optical axis of the lens 110 may be aligned with each other.

The power supply member 500 may be arranged on the printed circuit board 300. In the exemplary embodiment of the present invention, although the power supply member 500 is illustrated to be arranged between the plural printed circuit boards 300, the arrangement position of the power supply member 500 may be variously changed.

The power supply member 500 may be electrically connected to the power supply member 130 to supply power to the power supply member 130. Specifically, the power supply member 500 and the other end 136 of the power supply member 130 are electrically coupled. At this time, the power supplied through the other end 136 of the power supply member 130 may be delivered to the heating member 120 through one end 132 of the power supply member 130.

Hereinafter, the assembling of the lens module 100 will be described.

FIGS. 5 to 10 are views showing each step of assembling of a lens module according to another exemplary embodiment of the present invention.

Figure 5:
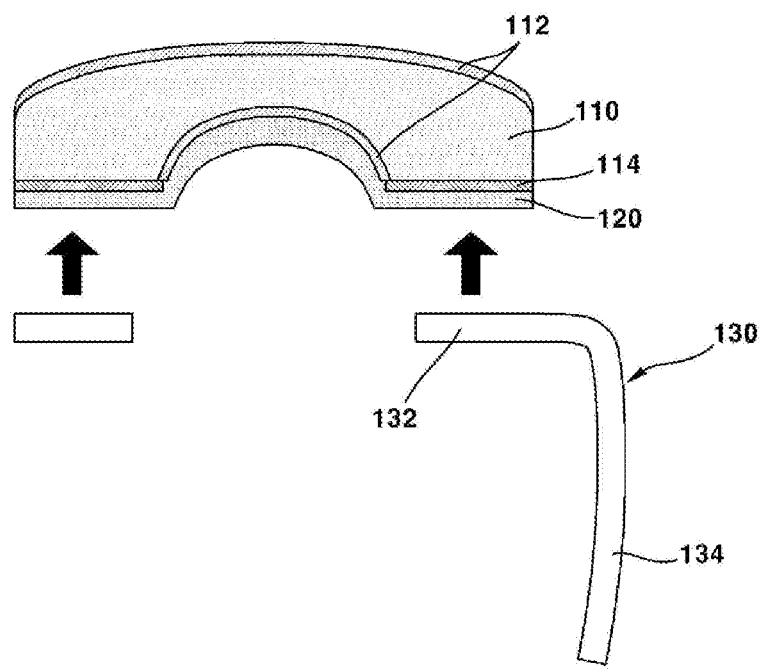
FIGS. 5 to 10 are views showing each step of assembling of a lens module according to another exemplary embodiment of the present invention.

Referring to FIG. 5, an anti-reflective (AR) coating layer 112 may be formed on the upper and lower surfaces of the lens 110. The AR coating layer 112 is a layer coated with a material such as $TiO_2$ or $SiO_2$ by a physical or chemical method, and increases the light transmittance of the lens 110. In addition, a black paint (BP) coating layer 114 is formed on the lower surface of the lens 110 so that the scattering (flare) inside the lens 110 can be inhibited.

After the pretreatment process such as the AR coating layer 112 and the BP coating layer 114, the heating member 120 is attached to the lens 110. The heating member 120 may be attached to the lens 110 by a coating process or a vapor deposition process.

Thereafter, the power supply member 130 is attached to the attached heating member 120. Specifically, one end 132 of the power supply member 130 may be electrically connected to the heating member 120 through an AFC bonding method or a heat radiation bonding method.

Figure 6:
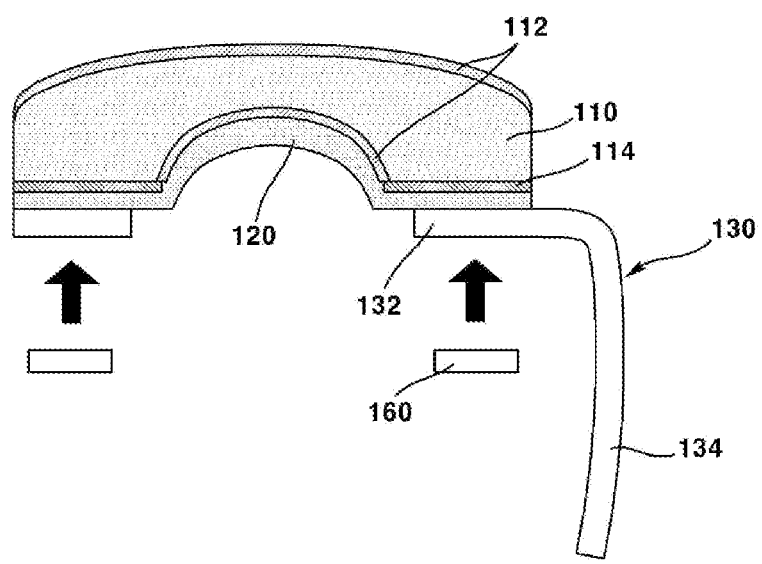

Referring to FIG. 6, an elastic member 160 is attached to the lower surface of the power supply member 130.

Figure 7:
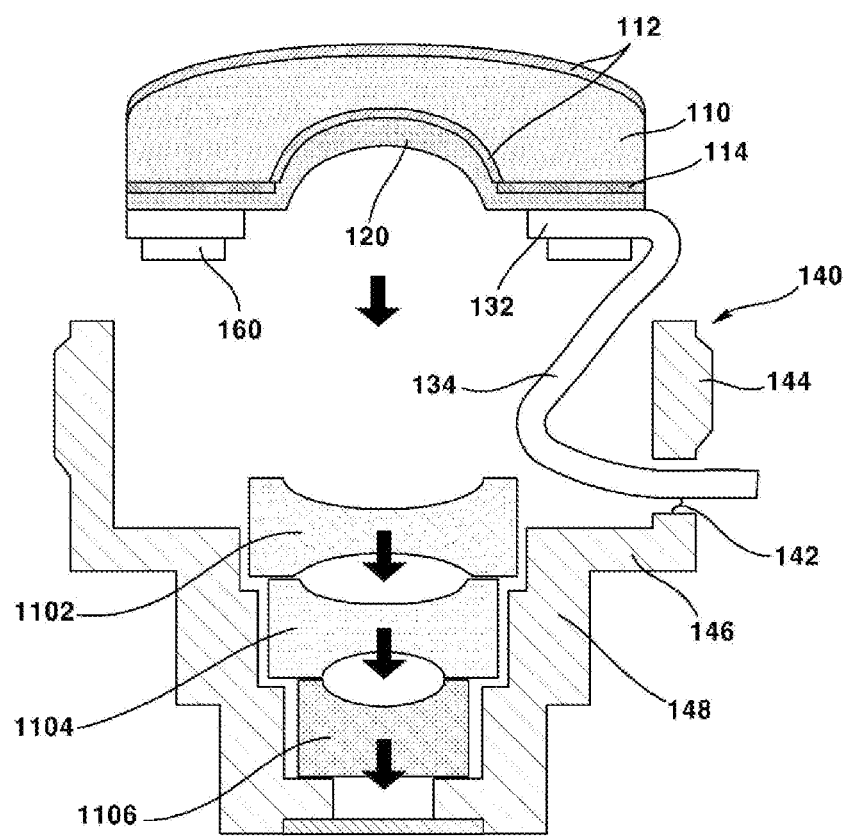

Referring to FIG. 7, the fourth lens 1106 is arranged inside the first accommodating portion 144 of the lens barrel 140, the third lens 1104 is laminated on the fourth lens 1106, the second lens 1102 is laminated on the third lens 1104, and the first lens 110 is laminated on the second lens 1102. The other end 136 of the power supply member 130 is being passed through the first hole 142 of the lens barrel 140 at the moment of stacking the first lens 110 over the second lens 1102 so that a portion of the connecting portion 134 of the 130 is positioned in the first hole 142 of the lens barrel 140.

Figure 8:
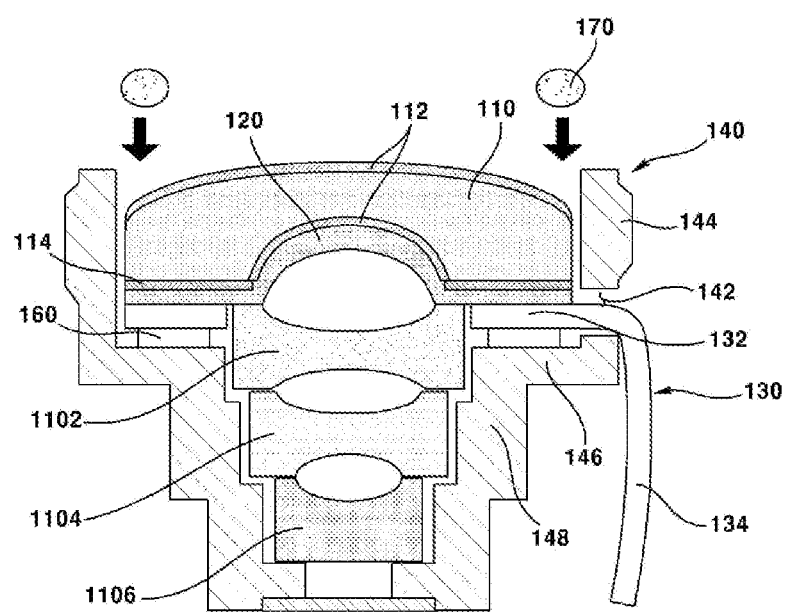

Referring to FIG. 8, the connecting portion 134 of the power supply member 130 that has penetrated through the first hole 142 of the lens barrel 140 is bent downward. Thereafter, the waterproof member is assembled to a gap being formed between the lens 110 and the lens barrel 140.

Figure 9:
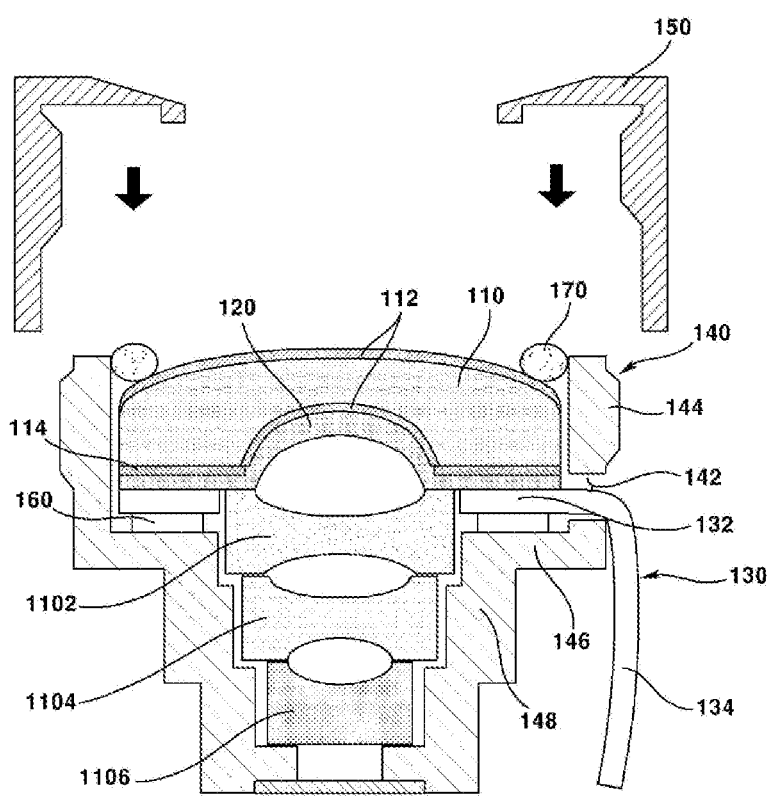

Referring to FIG. 9, the retainer 150 is pressed downward from the top of the lens 110 and the lens barrel 140, thereby coupling the retainer 150 to the lens barrel 140. At this time, the connecting portion 134 of the power supply member 130 is positioned between the lens barrel 140 and the retainer 150 to face downward.

Figure 10:
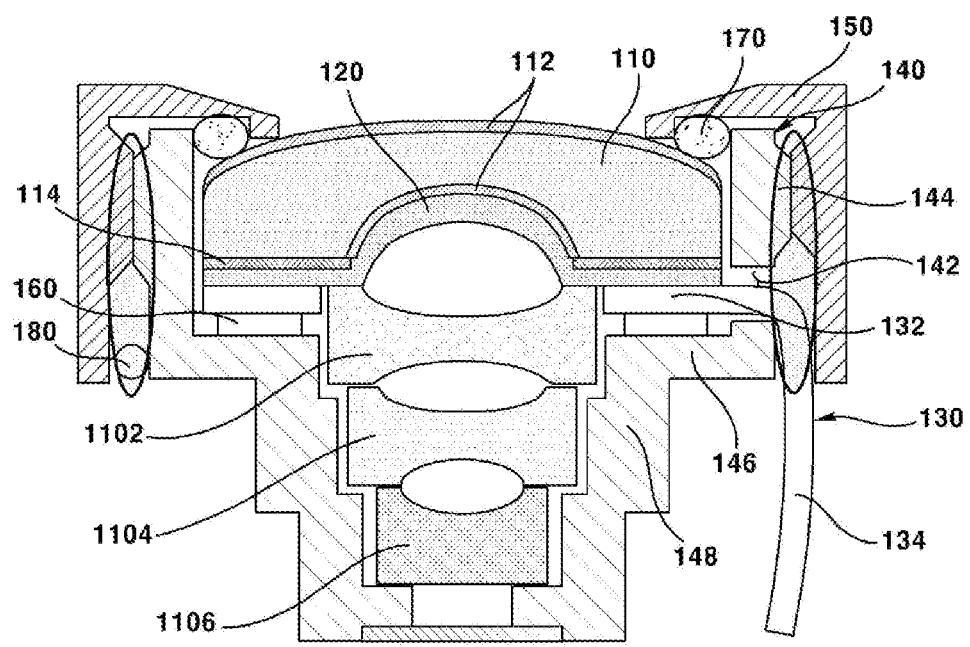

Referring to FIG. 10, the lens barrel 140 and the retainer 150 may be coupled by an adhesive member 180 such as an epoxy. The epoxy can be cured by ultraviolet (UV) and heat.

The lens module 100 according to another exemplary embodiment of the present invention is only different from the lens module 100 according to the exemplary embodiment of the present invention in the number of lenses 110, 1102, 1104, 1106, and the specific shape of the lens barrel 140 to accommodate the plurality of lenses 110, 1102, 1104, 1106, the other configurations may be interpreted as the same.

Hereinafter, the assembling of the camera module 10 will be described.

Figure 11:
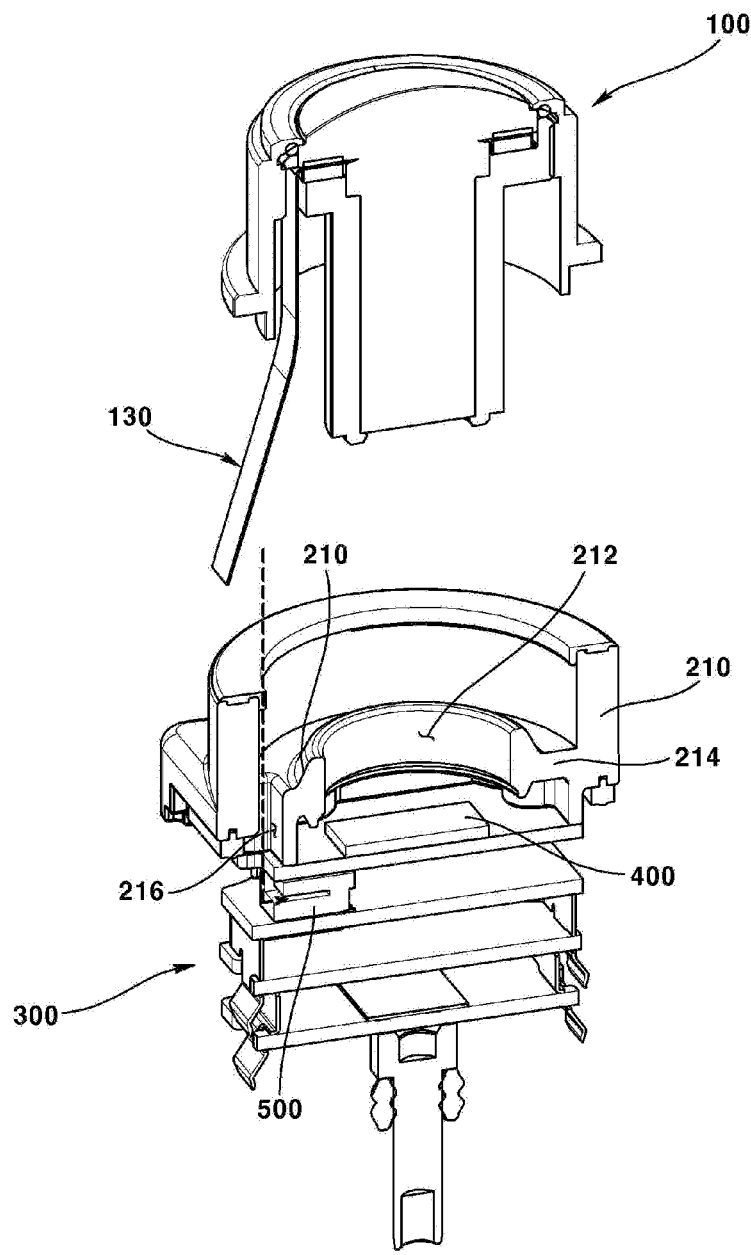
FIGS. 11 and 12 are diagrams illustrating each step of assembling of a camera module according to the exemplary embodiment of the present invention.
Figure 12:
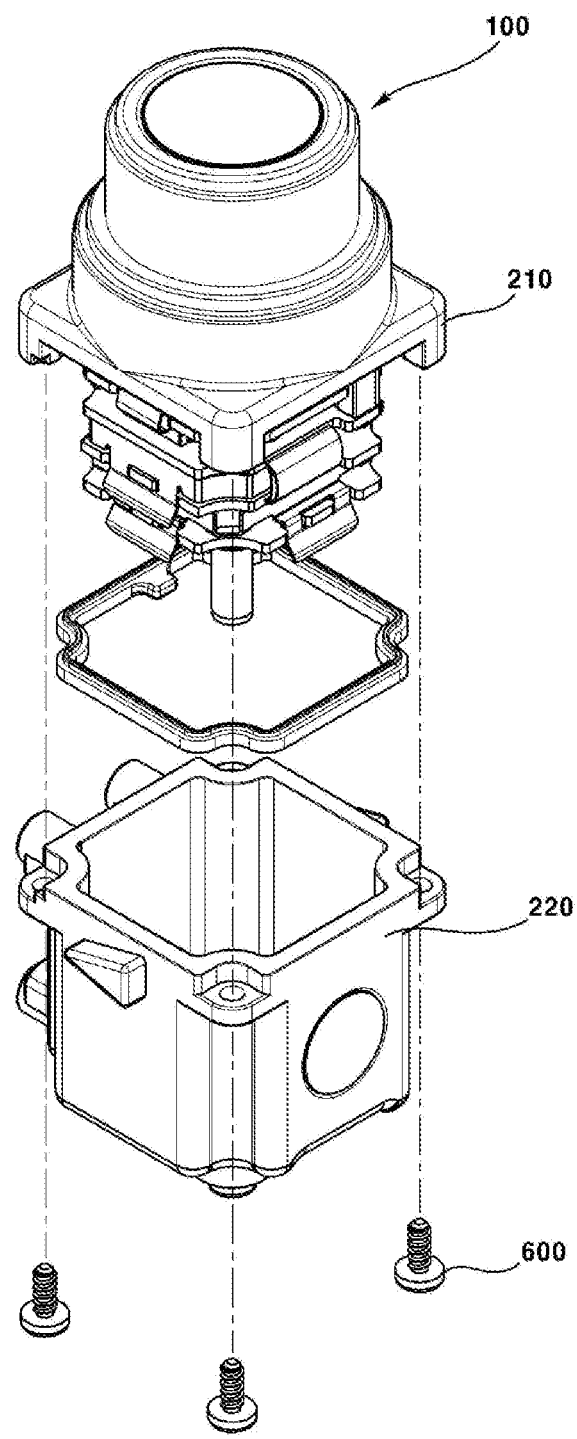

FIGS. 11 and 12 are diagrams illustrating each step of assembling of a camera module according to the exemplary embodiment of the present invention.

Referring to FIG. 11, the lens module 100 is seated and coupled to the second accommodating portion 212 of the upper lens holder 210 in the downward direction from the upper lens holder 210. At this time, the other end 136 of the power supply member 130 is guided by a guide member 218 to be penetrated through the second hole 216 of the upper lens holder 210.

In addition, the printed circuit board 300 may be coupled to the upper lens holder 210 by a screw coupling method and the like.

Referring to FIG. 12, a portion of the connecting portion 134 of the power supply member 130 that has been penetrated through the second hole 216 is bent, thereby electrically connecting the other end 136 of the power supply member 130 to the power supply member 500 mounted on the printed circuit board 300.

Thereafter, the upper lens holder 210 and the lower lens holder 220 are coupled by a screw coupling method, and arranged inside the lower lens holder 220 of the printed circuit board 300.

The lens module 100 and the camera module 10 according to the exemplary embodiment of the present invention can inhibit the occurrence of condensation and/or freezing in the lens 110 by forming a heating member 120 in the lens 110 and generating heat therefrom.

The camera module 10 comprising the heating member 120 may have a failure according to use. According to the lens module 100 and the camera module 10 according to the exemplary embodiment of the present invention, since the lens module 100 is detachably coupled to the lens holder 200, the failure of the camera module 10 can be easily addressed through a replacement process of the lens module 100.

In addition, since the lens module 100 according to the exemplary embodiment of the present invention is arranged compactly inside the camera module 10, it is easy to manufacture and has an advantage of realizing miniaturization of a product.

Although exemplary embodiments of the present invention have been described above with reference to the accompanying drawings, those skilled in the art to which the present invention belongs may understand that the present invention can be implemented into other specific forms without changing the technical spirit or essential features thereof. Therefore, it should be understood that the exemplary embodiments described above are exemplary in all respects and not restrictive.

The invention claimed is:

1. A camera module comprising:
   at least one lens;
   a lens barrel comprising a first hole and accommodating the lens;
   a lens holder accommodating the lens barrel;
   a printed circuit board arranged in the lens holder;
   a heating member arranged in the lens; and
   a power supply member penetrating the first hole and electrically connecting the heating member and the printed circuit board,
   wherein the power supply member comprises one end connected to the heating member, a connecting portion formed by being extended from the one end and passing between the lens barrel and the lens holder, and an other end formed by being extended from the connecting portion and connected to a printed circuit board,
   wherein the lens holder comprises a second accommodating portion accommodating the lens barrel and a sealing portion sealing between the second accommodating portion and the lens barrel,
   wherein the sealing portion comprises a second hole through which the connecting portion penetrates, and
   wherein the lens holder comprises a guide member configured to guide the power supply member to penetrate the second hole.

2. The camera module of claim 1, wherein the lens barrel comprises a first accommodating portion that accommodates at least a portion of the lens and the power supply member, an extension portion formed by being extended from the first accommodating portion toward an inner side of the lens barrel, and a vertical portion formed by being extended from the extension portion toward the lens barrel in a direction parallel to an optical axis, and
   wherein the first hole is formed at the first accommodating portion.

3. The camera module of claim 1, comprising:
   an elastic member arranged between one end of the power supply member connected to the heating member and an inner side surface of the lens barrel facing the one end of the power supply member,
   wherein the elastic member is in a shape of a ring.

4. The camera module of claim 1, comprising:
   a waterproof member arranged between the lens and the lens barrel.

5. The camera module of claim 1, comprising:
a retainer coupled to the lens barrel to fix the lens accommodated in the lens barrel.

* * * * *